United States Patent [19]

Arroyo et al.

[11] Patent Number: 5,426,716
[45] Date of Patent: Jun. 20, 1995

[54] MAGNETICALLY LOCATABLE NON-METALLIC OPTICAL FIBER CABLES

[75] Inventors: Candido J. Arroyo, Lithonia, Ga.; Sungho Jin, Millington; Thomas T. M. Palstra, New Providence, both of N.J.

[73] Assignee: AT&T Corp., Murray Hill, N.J.

[21] Appl. No.: 220,777

[22] Filed: Mar. 31, 1994

[51] Int. Cl.⁶ .............................................. G02B 6/44
[52] U.S. Cl. ................................... 385/100; 385/104; 385/113
[58] Field of Search ............................. 385/100–109, 385/113

[56] References Cited

U.S. PATENT DOCUMENTS

| | | | |
|---|---|---|---|
| 4,701,016 | 10/1987 | Gartside et al. | 350/96.23 |
| 4,874,219 | 10/1989 | Arroyo et al. | 350/96.23 |
| 4,938,560 | 7/1990 | Arroyo et al. | 350/96.23 |
| 4,946,237 | 8/1990 | Arroyo et al. | 350/96.23 |
| 5,006,806 | 4/1991 | Rippingale et al. | 324/326 |
| 5,017,873 | 5/1991 | Rippingale et al. | 324/326 |
| 5,305,410 | 4/1994 | Arroyo | 385/109 |
| 5,305,411 | 4/1994 | Arroyo | 385/109 |

Primary Examiner—Rodney B. Bovernick
Assistant Examiner—Phan T. H. Palmer
Attorney, Agent, or Firm—Donald E. Hayes, Jr.

[57] ABSTRACT

The present invention relates to an optical fiber cable which includes magnetically locatable materials within the sheath system thereby allowing the cable to be located after it has been buried. More specifically, at least a portion of the magnetic particles are purposely oriented in a particular alignment based on their magnetic properties. Such an arrangement not only allows the generation of a detection signal which is distinguishable from that generated by a solid metallic pipe, but also can greatly enhance the level of the detection signal generated. The enhanced detection signal provides for more reliable detection of buried all-dielectric cables and also allows them to be located even when buried at greater depths, such as six feet or more. In specific embodiments of the present invention, the magnetic particles may be aligned and/or magnetized either longitudinally, vertically or transversely relative to the cable. Additionally, these various directions of alignment and magnetization may be alternated along the length of the cable to further enhance the detection signal generated in order to establish a means of accurately and cost-effectively locating communications cable after they are buried.

20 Claims, 7 Drawing Sheets

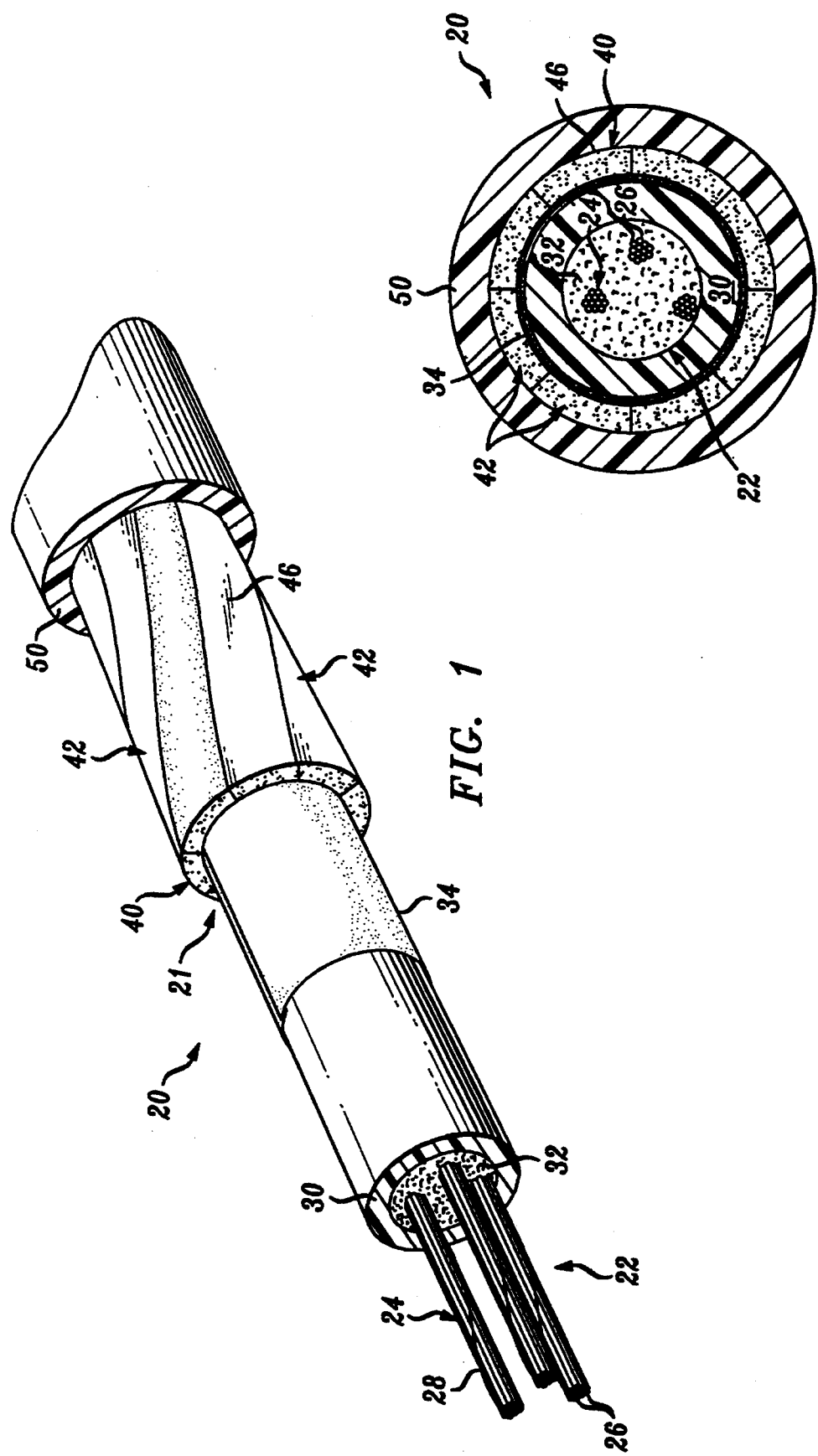

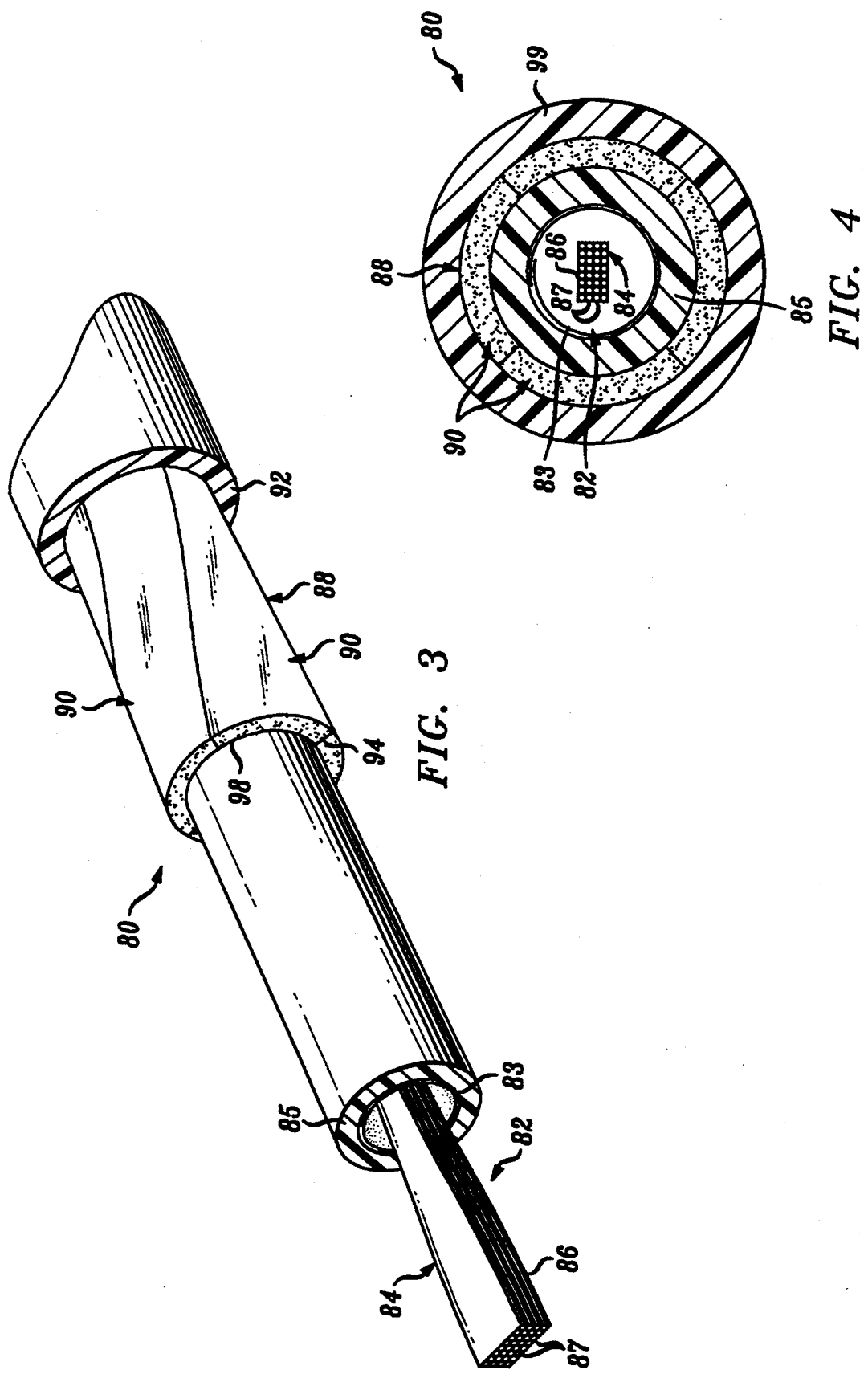

CABLE LENGTH DIRECTION ⟶
MAGNETIZATION DIRECTION ⟶

HIGHEST SIGNAL  LOWEST SIGNAL  HIGHEST SIGNAL

*FIG. 7a*  CABLE LENGTH DIRECTION →
MAGNETIZATION DIRECTION →
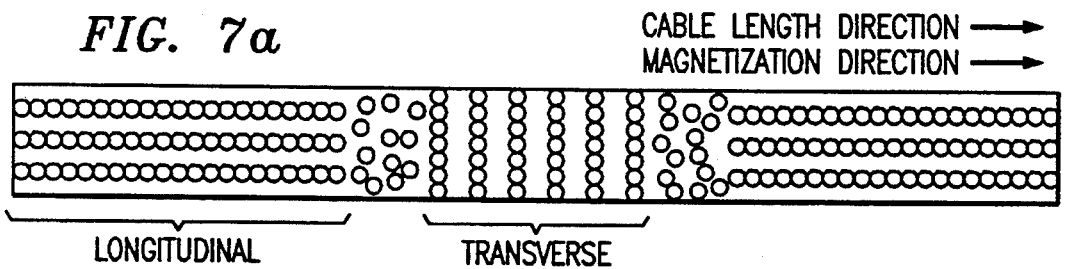
LONGITUDINAL — TRANSVERSE
*FIG. 7b*
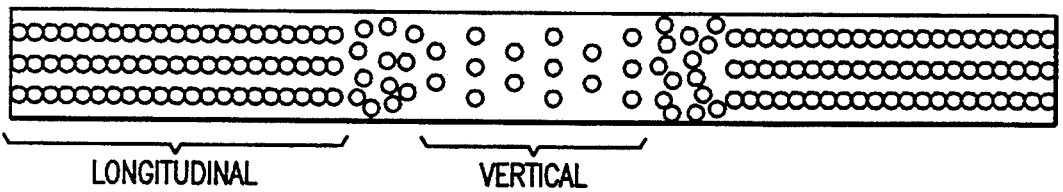
LONGITUDINAL — VERTICAL
*FIG. 7c*
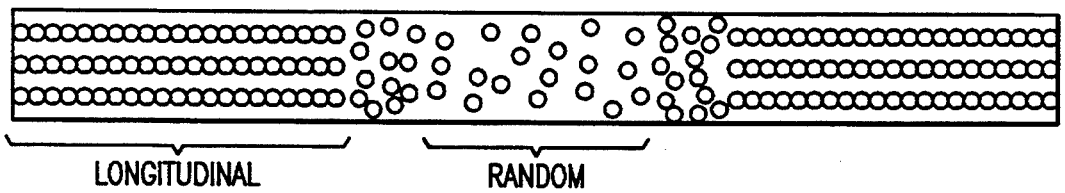
LONGITUDINAL — RANDOM
*FIG. 7d*  CABLE LENGTH DIRECTION →
MAGNETIZATION DIRECTION ↑
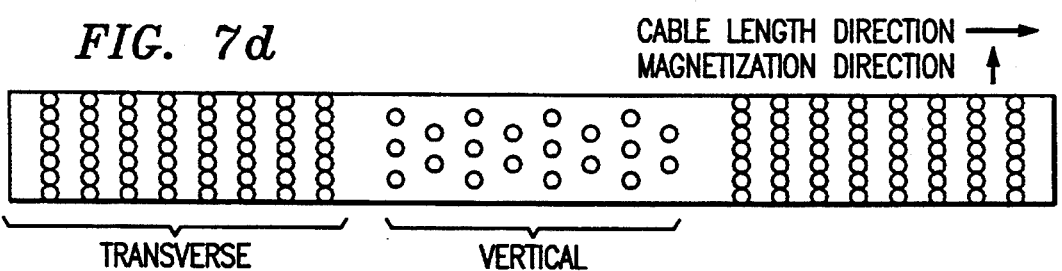
TRANSVERSE — VERTICAL
*FIG. 7e*  CABLE LENGTH DIRECTION →
MAGNETIZATION DIRECTION →
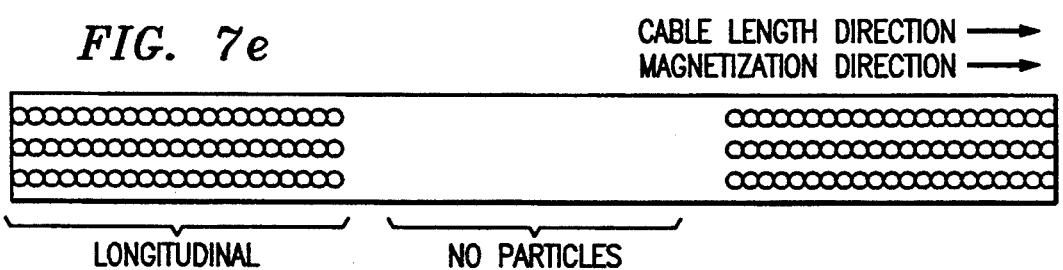
LONGITUDINAL — NO PARTICLES

MAGNETICALLY LOCATABLE NON-METALLIC OPTICAL FIBER CABLES

TECHNICAL FIELD

This invention relates to a magnetically locatable all-dielectric optical fiber cable containing non-metallic permanent magnet marker material. More particularly, the cable design of this invention includes non-metallic magnetic materials which have been purposely oriented in selected arrangements in order to optimize the detectability of the cable after it has been buried beneath the earth.

BACKGROUND OF THE INVENTION

Prompt and accurate locating of buried optical fiber cable for maintenance and repair is essential for minimizing disruption in telecommunication service. The two basic types of optical fiber cables presently used in the industry are metallic cables and dielectric (or non-metallic) cables. At present, it is believed that slightly less than one-third of telecommunication systems use dielectric fiber optic cable. However, surveys indicate that many, if not most, would use dielectric cables instead if there existed a reliable and cost-effective method to locate the dielectric cable after it has been buried.

Presently, there are basically two general types of technologies involved in the detection of buried fiber optic cable, magnetic and metallic. In general, the existing magnetic locators consist of either 1) permanent magnetic elements designed or embedded into the cable, or 2) a permanent magnetic-field emitting product which is buried alongside the length of the cable. With these two magnetic-based detection techniques, the residual magnetization generated by the magnetic hysteresis of the permanent magnetic material within the cable may then be detected by a magnetic field sensor. However, due to the inconsistencies in the distribution pattern of the magnetic field, it is often difficult to detect the correct cable when other magnetic members are located nearby. In an additional arrangement, the cable may be positioned within a separate duct which is magnetized.

Alternatively, there exists fiber optic cable locators which are capable of locating cables which were specifically designed to include metallic components, such as a protective sheathing member or a strength member. Such detection methods detect the electromagnetic field emanating from the metal as a result of the application of an alternating current or an alternating magnetic field to the metallic sheathed cable. However, the electric and/or magnetic field generated by the application of an AC electric signal to the cable is often not strong enough to allow a determination of the precise location of the cable. Ineffective low levels of field strength are of a particular interest when attempting to locating cables where the AC signal is transmitted from a remote position and must travel a substantial distance. Additionally, these metallic sheaths are susceptible to damage due to lighting strikes or corrosion.

Commonly, to facilitate detecting a dielectric cable, a copper ground wire is positioned just above the cable. However, the exposed nature of this ground wire makes it very vulnerable to lightning strikes and propagation of the damages to the optical fibers in the cable. Furthermore, when a cable's armor or detection wire is severed by lightning or some other cause, it becomes impossible to apply an electric signal along the cable, thus creating great difficulty in locating and retrieving the cable for repair. Therefore, it is preferable to employ the locating marker inside the cable to ensure locating accuracy.

Other existing detection methods include incorporating a non-conductive tape which has been covered with a magnetic powder such as strontium or barium ferrite or compounding and extruding these magnetic powders in polyethylene or polyvinyl chloride conduits. Both of these methods employ a means of magnetizing a tape and helically wrapping it along the length of the cable or magnetizing a strip along the length of the conduit. Each method also provides a distinctive electronic-detection signature which allows an operator to differentiate between a buried cable and a solid metallic pipe. See U.S. Pat. Nos. 5,006,806 and 5,017,873 which are assigned to Schondstedt Instrumentation Company of Reston, Va. One other concern with existing techniques is an inability to accurately position and secure the locatable particles as needed within the cable without decreasing the line speed at which the cables can be produced. This is of particular interest in configurations where the locatable particles are placed within portions of the cable which are often extruded, such as the outer jacket.

What is needed and seemingly not available in the prior art is a system which dependably, accurately and cost-effectively locates dielectric (non-metallic) buried cables. Also desirable is a system for locating buried dielectric cables which is readily adaptable to most, if not all, existing cable types. One newly introduced method involves modifying the existing water-blocking tape present in the cable so that the cable becomes magnetically locatable without adversely affecting the operational characteristics of the cable. Such a design is described in commonly assigned U.S. Pat. No. 5,305,410. Additionally, a second commonly assigned U.S. Pat. No. 5,305,411 which issued Apr. 19, 1994, discloses introducing magnetic particles into the existing strength members utilized within most cable designs. Yet another cable design is described in a commonly assigned application filed on the same date as this application. However, while addressing concerns similar to that of the above-identified co-pending identified co-pending applications, the present invention is not directed toward modifying the strength member portion or the water-blocking portion present in most communication cables as taught by the applications identified immediately above, but instead, introduces a variety of different arrangements regarding the orientation of the particular magnetic particles within the cable to optimize the ability of an operator to precisely locate an all-dielectric cable using a magnetometer after the cable has been buried.

SUMMARY OF THE INVENTION

The present invention relates to an optical fiber cable which includes magnetically locatable materials within the sheath system thereby allowing the cable to be located after it has been buried. More specifically, at least a portion of the magnetic particles are purposely oriented in a particular alignment based on their magnetic properties. Such an arrangement not only allows the generation of a detection signal which is distinguishable from that generated by a solid metallic pipe, but also can greatly enhance the level of the detection signal generated. The enhanced detection signal provides for more reliable detection of buried all-dielectric cables and also allows them to be located even when buried at greater depths, such as six feet or more. In specific embodiments of the present invention, the magnetic particles may be aligned and/or magnetized either longitudinally, vertically or transversely relative to the cable. Additionally, these various directions of alignment and magnetization may be alternated along the length of the cable to further enhance the detection signal generated in order to establish a means of accurately and cost-effectively locating communications cable after they are buried.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an exemplary dielectric optical cable design;

FIG. 2 is an end cross-sectional view of the cable of FIG. 1;

FIG. 3 is a perspective view of an alternate embodiment of a dielectric optical cable design;

FIG. 4 is an end cross-sectional view of the cable of FIG. 3;

FIGS. 7a-7e depict other microstructural signatures obtainable by different combinations of alignment directions;

DETAILED DESCRIPTION

Figure 5A:
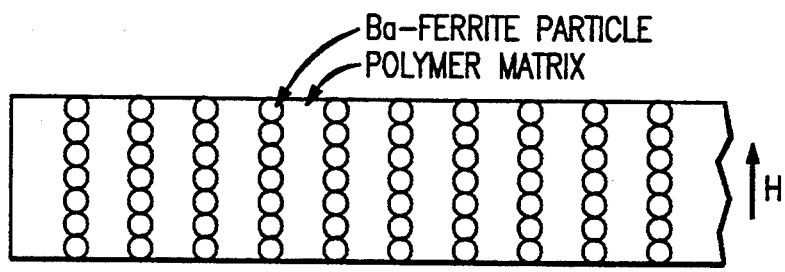
FIGS. 5a-5e are top views of microstructures illustrating the various particle alignment configurations in accordance with the present invention.
Figure 5B:
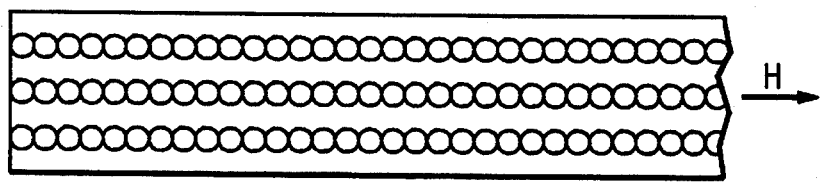
Figure 5C:
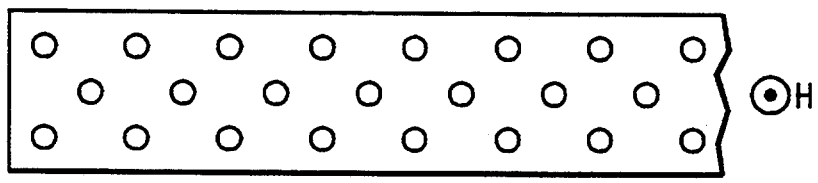
Figure 5D:
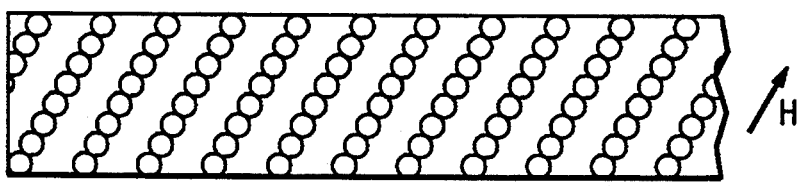
Figure 5E:
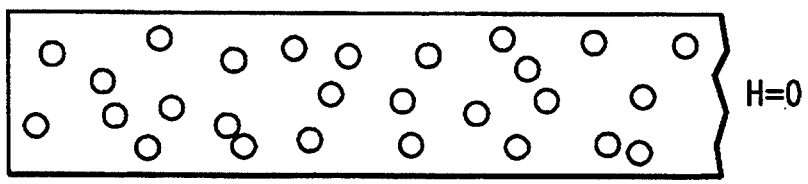

Referring now to FIGS. 1 and 2, there is shown a cable which is designated generally by the numeral 20 and which is a cable having an all-dielectric sheath system 21. The structure is such that it provides excellent protection against rodent attacks and lightning. An exemplary non-metallic cable is set forth below to illustrate one type of existing cable design which may benefit from the alignment and orientation schemes of the present invention. The particulars of this invention are discussed in specific detail immediately following the discussion on cable structure. However, the attributes of the present invention may be realized regardless of the exact technique or component chosen to carry the locatable material, whether combined with existing strength members, water-blocking materials, or jacket or whether included as a separate layer, such as in an epoxy resin.

As can be seen in FIGS. 1 and 2, a cable 20 includes a core 22 which comprises at least one transmission media. For example, the core 22 may comprise one or more units 24—24 each of which includes a plurality of optical fibers 26—26. Each of the units 24—24 is provided with a binder 28. The unit or units is disposed within a tubular member 30 which is made of a plastic material such as polyethylene, for example.

An inner diameter of the tubular member 30 is such as to control the ratio of the total cross-sectional area of the coated optical fibers within the core to the cross-sectional area defined by the inner surface of the wall of the tubular member. This allows the optical fiber unit or units sufficient movement during handling, installation and temperature cycling to avoid losses due to microbending.

Further, the tubular member, or core tube 30 as it is often called, may be filled with a suitable water blocking material 32. A suitable water-blocking material may be one such as that disclosed and claimed in U.S. Pat. No. 4,701,016 which issued on Oct. 20, 1987 in the names of C. H. Gartside, III, et al. and which is incorporated by reference hereinto. However, it should be noted that other well-known types of filling compounds may also be used in accordance with the present invention. Additionally, a layer of water absorbing material 34 may be positioned outside the core tube 30 to prevent water from flowing along the length of the cable.

About the core tube 30 is disposed a dielectric armor which is in the form of a shell and which is designated generally by the numeral 40. In the preferred embodiment of the present invention, the shell 40 comprises a plurality of individual preformed segments 42—42. The segments 42—42 are such that they cooperate to provide a generally circular shell 40 for the core tube. Accordingly, each segment 42 is arcuately shaped and is disposed about the core tube such that a surface 46 thereof having the larger radius of curvature is oriented toward the outside of the cable.

Each of the segments 42—42 is made of a dielectric material such as organic or inorganic fibers embedded in a solid dielectric matrix material. In a preferred embodiment, each segment comprises glass fibers embedded in a cured epoxy matrix. However, the material from which the segments are made may be any one of a number of materials which are available commercially. What is important is that such material has relatively high tensile strength, relatively high compressive strength, is non-metallic and is a material which upon contact with the mouths of rodents discourages further attack. Such other materials include, for example, KEVLAR ® fiber material, S Glass, T Glass or carbon fiber material in an epoxy matrix.

In the preferred embodiment, glass rods available commercially from the Air Logistics Corp. under the designation E-glass are used. Each shell segment 42 comprises a substrate which includes as many as 4000 continuous unidirectional fiber glass filaments bonded together in an epoxy material matrix. This causes the substrate to become relatively stiff and is rendered capable of withstanding expected compressive as well as tensile stresses. Expected compressive stresses include those which are induced by thermal cycling, and initial shrinkage of the jacket material, for example. In the preferred embodiment, each shell segment 42 is characterized by a tensile stiffness of about 131 kg per one percent strain. Lastly, an outer jacket 50, preferably made of a plastic material such as polyvinyl chloride (PVC) or polyethylene (PE), surrounds each of the other components. Example of such shell arrangements are more specifically described in commonly assigned U.S. Pat. Nos. 4,874,219, 4,946,237 and 4,938,560.

In another embodiment which is shown in FIGS. 3 and 4, a cable 80 includes a core 82 comprising transmission media 84 and a core tube 85. The transmission media 84 may be enclosed with a core wrap 83 disposed between the transmission media 84 and the core tube 85. The core wrap 83 protects the media 84 during the extrusion of the core tube 85. In this embodiment, the transmission media 84 may include a plurality of stacked ribbons 86—86. Each ribbon 86 includes a planar array of optical fibers 87—87. Enclosing the core tube 85 is a shell 88 comprising a plurality of arcuately shaped segments 90—90. In the particular embodiment shown, the shell 88 comprises four segments 90—90. Over the shell 88 is disposed an outer jacket 92. As in the earlier described embodiment, the jacket 92 may be a plastic material such as polyvinyl chloride or polyethylene. In addition to the components set forth above, this embodiment of the present invention may include a form of known water absorbing materials similar to those described in association with item 34 of the previously discussed embodiment.

The present invention identifies and utilizes three basic parameters which collectively establish the effectiveness or magnetic cable-locating systems. Generally, magnetic detection depends on the following: 1) selecting the proper magnetic material (permanent or soft magnet), 2) determining the optimum magnetic marking or orientation on the cable (magnetize the tape along its width, thickness or length), and 3) selecting a reliable detection device. In particular, the present invention utilizes these parameters to select, position, and more specifically orient, the particular magnetic materials within existing communication cable designs to optimize the ability of an operator to reliably and cost-effectively locate this all-dielectric cable after it has been buried.

With regard to the first parameter involving the selection of the most appropriate type of magnetic material, the distinguishing operational factors of both permanent magnetic materials and soft magnetic materials should be compared. In general, permanent magnets are passive devices in which electromagnetic energy has initially been stored by a large aligning magnetic field. Therefore, permanent magnets are the preferred type of magnetic material for use within a communications cable since they require no externally applied current or force to maintain their magnetic characteristics.

However, it should be noted that while dielectric permanent magnetic materials are used in the preferred embodiment, dielectric soft magnetic materials may be used in accordance with the present invention within applications where the soft magnetic materials may be conveniently magnetized, such as through induction, in the presence of an AC or DC field used for detection. As an example of such acceptable materials, nickel zinc ferrite is a soft magnetic material commonly used throughout industry.

The second factor relates to the selection of the most appropriate marking or orientation of the magnetic materials. While the desire to optimally orient the magnetic particles within the cable is briefly mentioned in the two co-pending, commonly-assigned patent applications previously referenced in this applications Background of the Invention, the present invention more precisely sets forth a number of various orientation options suitable to enhance the detectablity of an all-dielectric communications cable. However, it is understood that variations from the exact orientational arrangements set forth herein may also be acceptable and envisioned in accordance with the present invention.

While a third factor identifies the detection unit as an important point of concern for the overall detection system, it should be noted that any well known detection unit may be used in accordance with the present invention.

Now turning specifically to the cable design in accordance with the present invention, as stated earlier, the optical fiber cable disclosed herein comprises magnetic marker material which has been precisely oriented in order to enhance the detectability of the cable after it has been buried.

A random distribution of the magnet materials within a cable may provide sufficient magnetic flux signal for magnetic detection under certain conditions of ample marker volume, and close measurement distance, etc., and hence such a distribution is not excluded from the invention. However, it has been discovered that a significantly improved detection signal is obtained if the magnet particles are longitudinally or linearly aligned into continuous chains, and at the same time the cured composite marker is magnetized in the same direction as the alignment direction. One manner of accomplishing this alignment scheme is by applying a magnetic field before the curing of a viscous matrix material which contains the magnetic materials is completed. The noted enhancement of the detection signal appears due to the combined effect of rotating each randomly oriented particle toward its most favorable magnetic anisotropy direction (magnetically strongest crystal orientation) and reducing by chain formation the air gap leakage of magnetic flux through the spacing between the particles.

The direction of alignment of particles in the composite marker can be in the longitudinal direction (parallel to the length of the sheet), transverse direction (width direction), vertical (thickness) direction, or in any fixed direction. The final magnetization direction in the cured marker material should coincide with the alignment direction to fully realize the benefits of the selected alignment. It has been determined that an arrangement where the magnetic particles are aligned in any of the directions mentioned above gives stronger flux and magnetic detection signal than the random distribution such as obtained in the absence of magnetic field. Testing results, which are presented in detail later, show that utilizing a longitudinal alignment scheme tends to give better magnetic flux and detection signals than the other alignment directions with the vertical alignment providing the smallest signal. The differences between the flux values and the detection signals generated for the varying alignment directions is attributable to the increased average length of the magnetic dipoles when the longitudinal alignment is employed. However, it should be noted that, depending on the particular application or environment of interest, the need to maximize the strength of magnetic flux may be minimal. In such applications, the alignment direction can be compromised for the sake of convenience and cost in industrial marker processing and cable assembly.

In accordance with the preferred embodiment of the present invention, the permanent magnet materials or powders are non-metallic (non-conducting) particles such as barium ferrite ($BaO\ 6\ Fe_2O_3$) or strontium ferrite ($SrO\ 6\ Fe_2O_3$) or a mixture thereof. These magnetic materials have high coercive force to resist self-demagnetization, are relatively safe in terms of lightning damages, are of low cost, and have good corrosion resistance. Metallic magnet particles (isotropic or elongated shape) such as $SmCo_5$, $Sm_2Co_{17}$, $Nd_2Fe_{14}B$, Alnico, Fe-Cr-Co, or a mixture thereof, may also be used as a constituent in the magnetic marker material provided that these metallic particles are aligned so as to avoid long-range continuity and lightning propagation. For example, these particles may be aligned not along the marker length direction but along the transverse direction of the strip by applying a magnetic field perpendicular to the length direction, or along the vertical direction by applying the field perpendicular to the plane of the marker strip. The magnetization of the cured marker material is carried out in the same direction as the alignment direction for maximum detection signal.

The alignment of magnetic particles may be accomplished by applying a constant DC field or a pulse field with sufficient duration to allow rotation and movement of magnetic particles. A permanent magnet or electromagnet may be used to provide the field. Typical field strength ranges from 20-50,000 Oe and preferably from 100-3000 Oe. The required duration of exposure to the field depends on a number of criteria. Among these are the viscosity of the medium into which the magnetic particles are to be disposed and the magnetic strength of the specific particles chosen. The needed duration increases with the magnetic saturation and permeability of the magnetic materials as well as the exact size of the magnetic particles used. In general, typical duration for alignment ranges from about 0.01 to 10 seconds. Additionally, the field is preferably left on or activated while the matrix material into which the magnetic particles were dispensed is at least partially polymerized or solidified in order to retain the desired particle alignment.

Typical microstructures of the magnetically aligned and cured marker composite sheets are schematically illustrated in FIG. 5 (top view). If the volume fraction is relatively high or if the particle size is small, some bridging between adjacent chains of spheres occurs. In the following examples, magnetic marker sheet samples were prepared and its magnetic detectability evaluated in order to more clearly depict the benefits of utilizing the various alignment schemes set forth in accordance with the present invention.

EXAMPLE 1

Approximately 30% by volume of demagnetized Ba-ferrite particles (average particle size of $\approx 15$ microns) was mixed with uncured epoxy. The mixture was sheeted out by doctor-blade technique into $\approx 0.020''$ thick $\times 0.4''$ wide $\times 3.4''$ long strips, and then selected areas were magnetically aligned in either the transverse or the longitudinal direction using a magnetic field of $\approx 2000$ Oe. Additionally, other portions of the sample were purposely left in their initial random alignment and subjected to no magnetic field. Then the epoxy containing the aligned particles was heat cured in the presence of the field by blowing hot air onto the material. The samples were then magnetized to their full magnetic strength by subjecting them to a field of $\approx 10,000$ Oe along the different directions. The magnetic flux signal from the transverse aligned, longitudinally aligned, and random-structured (no field) sample portions were measured at a 3-foot distance using a flux gate magnetometer with a detection resolution of $\approx 0.001$ mOe. The results are given in Table 1:

TABLE 1

| | | Magnetic Flux Signal at 3 Ft. Distance (in mOe) | |
|---|---|---|---|
| | | Magnetization Direction | |
| | | Transverse | Longitudinal |
| Alignment Direction | Transverse | 0.55 | 0.20 |
| | Longitudinal | 0.20 | 0.75 |
| | No Alignment | 0.40 | 0.35 |

As is evident from Table 1, the longitudinal alignment, combined with longitudinal magnetization, gives the highest signal, about 100% improvement over that in the no-alignment sample, and about 36% improvement over that with transverse-aligned and transverse-magnetized sample.

In a long continuous cable, the longitudinal magnetization in the longitudinally aligned marker has to be interrupted in order to have the detectable leakage flux exit periodically from the length of buried cable. In accordance with the preferred embodiment of the present invention, the desired length of magnetic dipole is approximately comparable to the detection measurement distance (e.g., the depth the cables are buried below the ground), i.e., $\approx 6$ ft. dipole length for $\approx 6$-ft. deep burial. The next 6-ft. length adjacent to the 6-ft. dipole is then either left demagnetized (e.g., by using a gradually decreasing AC field) or magnetized in the opposite polarity to its neighbor. In both cases, the discontinuity in magnetization causes the magnetic flux to leak out of the cable periodically for above-the-ground detection. Such discontinuities in longitudinal magnetization may be obtained by using on/off type or polarity-reversing pulse electromagnet. Using either of these types of equipment allows the magnetic marker to be fed continuously for magnetization through the field generated by the device. Furthermore, it should be noted that in accordance with the present invention, such controllable exposure to electromagnetic fields may be done either before or after the cable is assembled. Additionally, the dipole length and polarity arrangement selected may follow certain pre-determined pattern to provide a unique magnetic signature for easy locating and identification.

In the case of transverse magnetization of transverse-aligned magnetic marker material, there is no need to interrupt the magnetization because the dipoles terminate at the side edge of the strip to naturally give magnetic leakage flux. However, if this marker is wrapped around cable inner tube into a cylindrical shape, then care must be taken not to make a complete turn to get the flux circuit closed. Some gaps may be introduced, or the transverse magnetization may be carried out after the wrap-around operation to get the desired flux leakage. For long continuous marker sheets, either standing alone or incorporated into cable structure, the transverse magnetization can be accomplished, for example, by on/off pulse electromagnet that magnetizes segment by segment as the cable is continuously passed along through the air gap which exists between the poles of an electromagnet.

Figure 6:
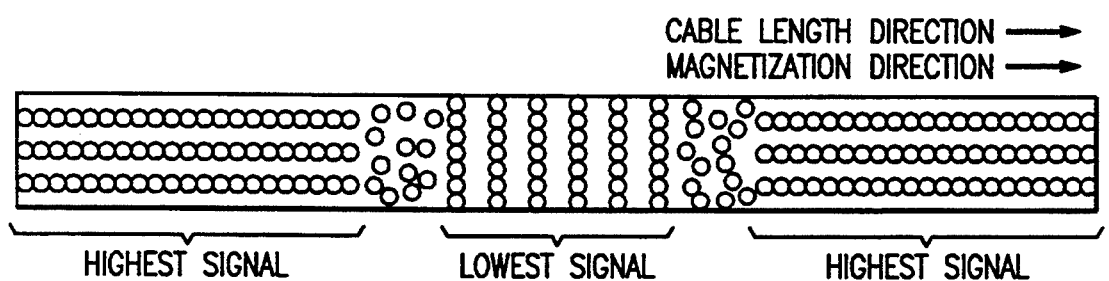
FIG. 6 illustrates a microstructural signature obtained by periodically alternating the particle alignment directions.
Figure 8A:
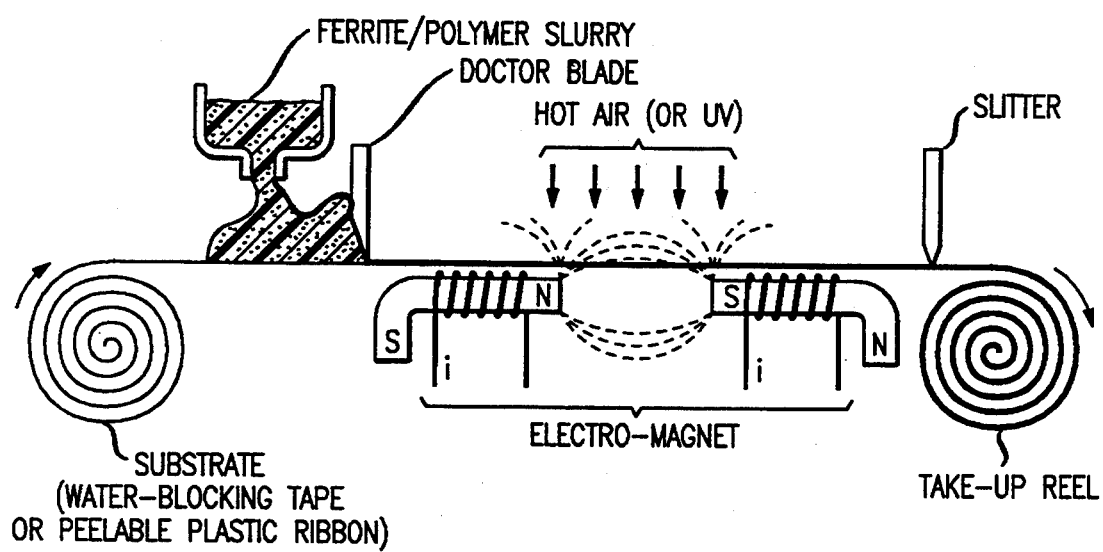
FIGS. 8a and 8b illustrate an exemplary magnetic marker processing system to introduce a desired microstuctural signature.
Figure 8B:
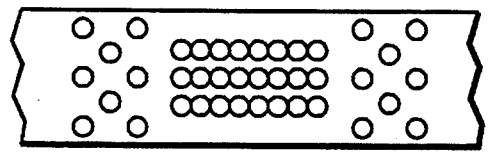

It is interesting to note from Table 1 that when the transverse aligned sheet is magnetized in the longitudinal direction, the magnetic signal output is the smallest, even smaller than in the case of random distribution (no alignment). This fact can be utilized to create a unique microstructural, and consequently magnetic, signature for identification purpose, for example as shown schematically in FIG. 6. With the microstructural signature, the following advantages can be realized. Firstly, the final magnetization of the processed marker, or the cable into which the marker material is incorporated, becomes much easier, due to the elimination of the need for complicated interruption of magnetic field (on/off), change of polarity or direction. The marker can simply be pulled continuously through the bore of constant field electromagnet or through a constant field supplied by a low-cost permanent magnet assembly. Secondly, the microstructural signature is non-erasable by external magnetic field, e.g., by a trailer parked above the buried cable which is hit by lightning and sends a pulse of magnetic field. In the case of magnetic signature provided by polarity alternating magnetization along the length the signature could be erased by the external field. FIG. 7 shows some variations in the microstructural signature that can be incorporated. These may be obtained by electromagnet, permanent magnet, or combinations of electromagnets and permanent magnets. FIG. 8 illustrates an example processing of how such a signature can be introduced in the marker material by a semi-continuous processing.

Figure 9A:
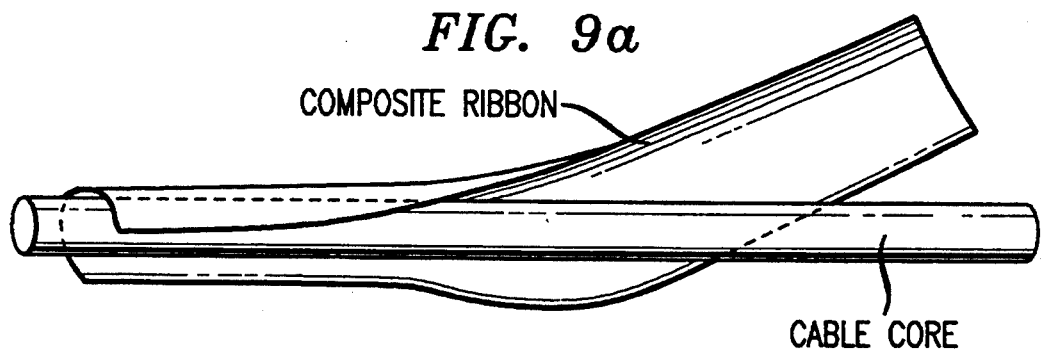
FIGS. 9a-9c present various arrangements for incorporating the magnetic marker material of the present invention into cables assemblies.
Figure 9B:
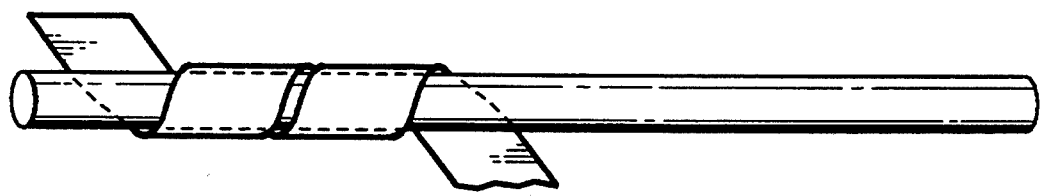
Figure 9C:
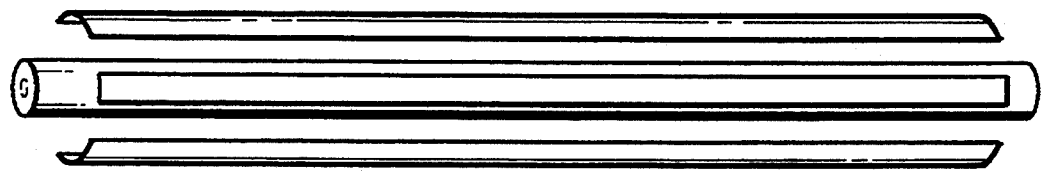

The magnetic marker sheets can be integrated into the optical fiber cable by a number of different ways, e.g., by wrap-around approach, helical winding, or addition as narrow strips, as shown schematically in FIG. 9. Some examples of the marker integration into cable geometry are described below but it is understood that other geometries not specifically set forth herein may also be deemed within the scope of the present invention.

EXAMPLE 2

About 30% by volume of barium ferrite particles are thoroughly mixed with uncured elastomer, such as General Electric RTV 615. The combination is then degassed, doctor bladed into 0.012" thick×1" wide×3" long sheets, aligned in the longitudinal direction using a 3000 Oe field supplied by an electromagnet, and heat cured in the presence of the field. The flexible composite sheets were peeled off the substrate and 12 pieces were bent around a 6 mm diameter mandrel (approximately the diameter of the core tubes commonly used in the communications industry) in series to a total length of 3 ft., and secured with adhesive tape. The 3-ft. long sample was then magnetized longitudinally by simply pulling it through a room-temperature bore of a 9 Tesla (90,000 Oe) superconducting magnet. The 3-ft. long sample, when measured by a flux-gate magnetometer with a detection sensitivity of 0.001 mOe, gave a signal of 3.4 mOe at 1-ft. distance, 0.52 mOe at 3-ft., 0.1 mOe at 5 ft., and 0.05 mOe at 6 ft.

EXAMPLE 3

Barium-ferrite particles (average $\approx 15$ micron size, $\approx 30\%$ by volume) were mixed with a water-soluble Latex emulsion containing $\approx 50\%$ solid. The mixture was sheeted out on a highly porous polyester cloth.

With a thickness of $\approx 0.008''$ and an estimated porosity of roughly $\approx 50\%$, placed in a longitudinal field of $\approx 4000$ Oe for particle alignment, and dry cured by heating with hot air. The final thickness of the semi-porous marker composite after drying was $\approx 0.013''$. Water-absorbing polymer (superabsorbent polymer powder), which is essential for the blockage of water seepage inside the optical fiber cable buried underground by swelling mechanism, was then applied to both surfaces of the semi-porous marker composite by mixing the superabsorbent powder with acetone and spray coating on the marker composite surface, filling part of the pores. After drying off the acetone, the total thickness of the composite coated with superabsorbent powder was $\approx 0.015''$. This sheet, $\approx 1''$ wide by $\approx 3''$ long, was wrapped around a 6 mm diameter mandrel, magnetized longitudinally, and evaluated for magnetic detection. The signal measured by the flux gate magnetometer at a distance of $\approx 3$ feet was $\approx 0.3$ mOe, which is roughly comparable to the value estimated considering the volume occupied by the cloth material itself.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein the layer of magnetically locatable material is optimized to provide sufficient flexibility and so as not to impede the alignment of the members during manufacture of the cable.

2. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, wherein the magnetically locatable material generates a detection signal which is distinguishable from that generated by a solid metallic pipe and is due to lengthwise variations in the direction the materials are aligned.

3. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein at least a portion of said magnetically locatable material is oriented with a direction of alignment longitudinal relative to the cable.

4. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein at least a portion of said magnetically locatable material has a magnetization which is longitudinal relative to the cable.

5. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein at least a portion of said magnetically locatable material is oriented with a direction of alignment transverse relative to the cable.

6. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein at least a portion of said magnetically locatable material has a magnetization which is transverse relative to the cable.

7. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein at least a portion of said magnetically locatable material is oriented with a direction of alignment vertical relative to the cable.

8. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein at least a portion of said magnetically locatable material has a magnetization which is vertical relative to the cable.

9. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein at least two portions of said magnetically locatable material are oriented with two different directions of alignment which are perpendicular to one another.

10. The cable of claim 9, wherein one of the two different directions of alignment is vertical.

11. The cable of claim 9, wherein one of the two different directions of alignment is longitudinal.

12. The cable of claim 9, wherein one of the two different directions of alignment is transverse.

13. The cable of claim 9, wherein said magnetically locatable material is a powder.

14. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein the magnetic material is concentrically disposed with longitudinal spacing along the length of the cable.

15. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, and wherein the magnetic material is disposed in a longitudinal strip along the length of the magnetically locatable means which is then helically wrapped about the tubular member.

16. An optical fiber cable, which includes:
a core comprising at least one optical fiber transmission medium;
a tubular member in which is disposed said core; and
a sheath system disposed about said tubular member which includes nonmetallic magnetic material which produces a magnetically locatable detection signal and wherein at least a portion of the magnetic materials are oriented in a particular alignment based on their magnetic properties, wherein the magnetically locatable material generates a detection signal which is distinguishable from that generated by a solid metallic pipe and is non-erasable.

17. The cable of claim 16, wherein the sheath system is made of a dielectric material.

18. The cable of claim 16, wherein said magnetically locatable material is a powder.

19. The cable of claim 16, wherein the magnetically locatable material is embedded in a cured epoxy matrix.

20. The cable of claim 16, wherein said magnetic material is selected from the group consisting of strontium ferrite, barium ferrite, and neodymium iron boron.

* * * * *